(12) United States Patent　(10) Patent No.: US 12,108,894 B2
O'Connor　(45) Date of Patent: Oct. 8, 2024

(54) DEVICE FOR PUTTING ELASTIC BOOTS ON A DOG

(71) Applicant: Daniel A O'Connor, Toronto (CA)

(72) Inventor: Daniel A O'Connor, Toronto (CA)

(73) Assignee: Daniel A. O'Connor, Toronto (CA)

( * ) Notice: Subject to any disclaimer, the term of this patent is extended or adjusted under 35 U.S.C. 154(b) by 383 days.

(21) Appl. No.: 17/450,149

(22) Filed: Oct. 6, 2021

(65) Prior Publication Data

US 2022/0110297 A1　Apr. 14, 2022

Related U.S. Application Data

(60) Provisional application No. 63/089,086, filed on Oct. 8, 2020.

(51) Int. Cl.
*A47G 25/80*　(2006.01)

(52) U.S. Cl.
CPC .................................. *A47G 25/80* (2013.01)

(58) Field of Classification Search
CPC ...... A47G 25/80; A47G 25/90; A47G 25/905; A47G 25/907; A47G 25/908
USPC .......... 223/111–112, 90, 91, 96; 24/334, 503
See application file for complete search history.

(56) References Cited

U.S. PATENT DOCUMENTS

| | | | | |
|---|---|---|---|---|
| 621,019 | A * | 3/1899 | Bernhard | A47G 25/481 223/96 |
| 718,794 | A * | 1/1903 | Reimard | A41F 11/02 24/537 |
| 1,634,532 | A * | 7/1927 | Bowe | A44B 99/00 24/503 |
| 2,228,360 | A * | 1/1941 | Nordeck | D06F 55/00 24/503 |
| 2,662,675 | A * | 12/1953 | Walker | A47G 25/481 223/96 |
| 3,100,324 | A * | 8/1963 | Tutino | D06F 55/00 24/537 |
| 3,143,261 | A * | 8/1964 | Brooke | A47G 25/483 223/91 |
| 3,744,686 | A * | 7/1973 | Levitin | A47G 25/183 24/535 |
| 4,756,453 | A | 7/1988 | Pettit et al. | |
| 5,249,720 | A | 10/1993 | White | |
| 5,513,783 | A | 5/1996 | White | |
| 7,395,951 | B2 | 7/2008 | Clayman | |
| 9,004,327 | B2 | 4/2015 | Kissel, Jr. | |
| 9,681,767 | B1 | 6/2017 | Barker et al. | |
| 9,833,094 | B2 | 12/2017 | Ricker | |
| 2020/0404884 | A1 | 12/2020 | Gibbins | |

* cited by examiner

*Primary Examiner* — Nathan E Durham

(57) ABSTRACT

A device that assists with putting elastic or rubber dog boots on a dog's paws. The has two arms and a compression spring therebetween that assist in stretching the opening or aperture of an elastic boot and holding the boot opening in this expanded shape such that the boot can be easily put on the pet paw. The device can then easily be removed, leaving the elastic shoe on the dog.

14 Claims, 12 Drawing Sheets

DEVICE FOR PUTTING ELASTIC BOOTS ON A DOG

CROSS-REFERENCE TO RELATED APPLICATIONS

This application claims priority to United States provisional patent application U.S. 63/089,086 filed on 8 Oct. 2020, which is hereby incorporated by reference herein in its entirety.

FIELD OF THE INVENTION

The present invention pertains to devices that facilitate the application or donning of an elastic pet shoe on pet paws. In particular, the present invention assists in putting elastomeric boots on a dog.

BACKGROUND

People enjoy taking their dogs for a walk. In winter weather and hot weather, people seek to protect their dog's paws from the weather and hazards associated with weather conditions. In particular, hot weather makes asphalt and concrete so hot that it can harm a dog's paws when out for a walk. Dog boots or shoes are used to protect a dog's paws from extreme heat, cold, wetness, snow, jagged rocks, broken glass and other potential sources of injury that a dog may encounter during a walk outside. To serve their protective role, dog boots are generally made of a durable material that can be fitted over a dog's paws to protect the dog from direct contact with walking surfaces. Various kinds of dog boots are available, including sewn articles with fasteners, as well as more simple versions such as disposable elastic dog boots, which are generally made from polymers such as rubber, silicone, or other elastomeric material. Elastomeric dog boots are popular as they are relatively inexpensive or disposable, and dogs generally don't mind wearing them. However, the combination of strength required to protect the dog's paws and the elasticity required to keep the boots in place during a walk can make it challenging for an owner to put rubber dog boots onto the paws of their pet. In particular, to stretch the elastomeric material to a sufficient diameter to accommodate a pet paw, a consistent force must be applied to widen the dog boot opening. Applying such an opening force to support an aperture where the paw can be inserted can be awkward, especially with an impatient or energetic dog. It can also be a challenging or difficult undertaking for some people who have limited hand strength and sometimes requires two people to stretch the boot and put the boot on a dog.

Various devices have been conceived to assist people with applying socks to both people and pets. In one example, U.S. Pat. No. 9,833,094B2 to Ricker describes a "Pet Boot Jack" device for securing an animal boot to an animal's foot. The device includes a pair of handles, a securing means, and a pair of jaws that are pivotally attached to the pair of handles by the securing means. When the pair of jaws are in a closed position, an open end of the animal boot is attached around the sides of the pair of jaws. Squeezing the pair of handles toward each other causes the pair of jaws to extend away from each other to an open position and also causes the pair of jaws to expand the open end of the animal boot.

For dog owners who have limited hand strength, applying a sufficient compressive force to a scissor-like hinged device to open an elastomeric boot can be difficult to impossible. In addition, maintaining the compressive force for long enough to put the expanded elastomeric boot aperture on the dog can be challenging, in particular with larger or impatient dogs. There remains a need for a device to help people to easily put rubber or elastic boots on their dog.

This background information is provided for the purpose of making known information believed by the applicant to be of possible relevance to the present invention. No admission is necessarily intended, nor should it be construed, that any of the preceding information constitutes prior art against the present invention.

SUMMARY OF THE INVENTION

An object of the present invention is to provide a device that assists with putting elastomeric or rubber dog boots on a dog's paws. The presently described device assists in stretching the opening or aperture of an elastomeric boot while on the device and holding the boot opening in this expanded shape such that the boot can be easily put on the pet paw. The device can then easily be removed, leaving the elastomeric shoe on the dog.

In an aspect there is provided a dog boot application device comprising: a first arm and a second arm each having a hinge end and a flange end, the flange end having an arm head with a flange having an arcuate cross section, the arcuate cross section of the flange ends on the first arm and second arm forming an aperture to receive an elastic dog boot; a hinge securing the first arm and second arm together at each hinge end; a compression spring secured at an intermediate position between the hinge end and the gripping end of each of the first arm and second arm, the spring applying a bias force to push the arm heads of the first arm and second arm away from one another; and a collar movable along the length of the first arm and second arm to compress the spring and hold the arms heads together when positioned adjacent the arm heads, and allow the arm heads to move apart when moved closer to the hinge.

In an embodiment, the device further comprises a locking mechanism adjacent to the arm head on at least one of the first arm and second arm to hold the collar in place when the spring is compressed.

In another embodiment, the hinge comprises a hinge lock to limit an angular distance between the first arm and the second arm when the collar is disengaged with the arm heads.

In another embodiment, the arm heads further comprise one or more gripping feature to retain the elastic dog boot.

In another embodiment, the arm heads further comprise a high-friction material to retain the elastic dog boot.

In another embodiment, the hinge comprises a pin and rivet.

In another embodiment, the first arm and second arm each comprise a mounting post sized to receive and secure the compression spring.

In another embodiment, the arcuate cross section of the flange ends on the first arm and second arm form a circular, oval, or stadium shaped aperture in the elastic dog boot when the arms are in an extended position and engaged with the elastic dog boot.

In another embodiment, the arm head of each arm is tapered relative to the arm.

In another aspect there is provided a method of applying a dog boot using a device comprising two arms each having a flange, a hinge attaching the two arms distal from the flanges, and a compression spring secured to the two arms, the method comprising: applying force to the two arms to compress the spring and bring the flanges of each of the two arms into proximity; moving a collar toward the flanges to hold the two arms together; stretching an aperture of the elastic pet boot around the flanges; moving the collar away from the flanges to release the compression spring and expand the aperture of the elastic dog boot; inserting a dog paw into the expanded aperture of the elastic pet boot; and releasing the aperture of the elastic dog boot from the flanges.

In an embodiment, the flange ends on the two arms form a circular, oval, or stadium shaped aperture in the elastic dog boot when the arms are in an extended position and engaged with the elastic dog boot.

In another embodiment, the method further comprises, when the collar is moved toward the flanges, securing the collar in place with a locking mechanism. Other features and advantages of the present invention are described more fully below. Embodiments of the present invention as recited herein may be combined in any combination or permutation.

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION OF THE INVENTION

Figure 1:
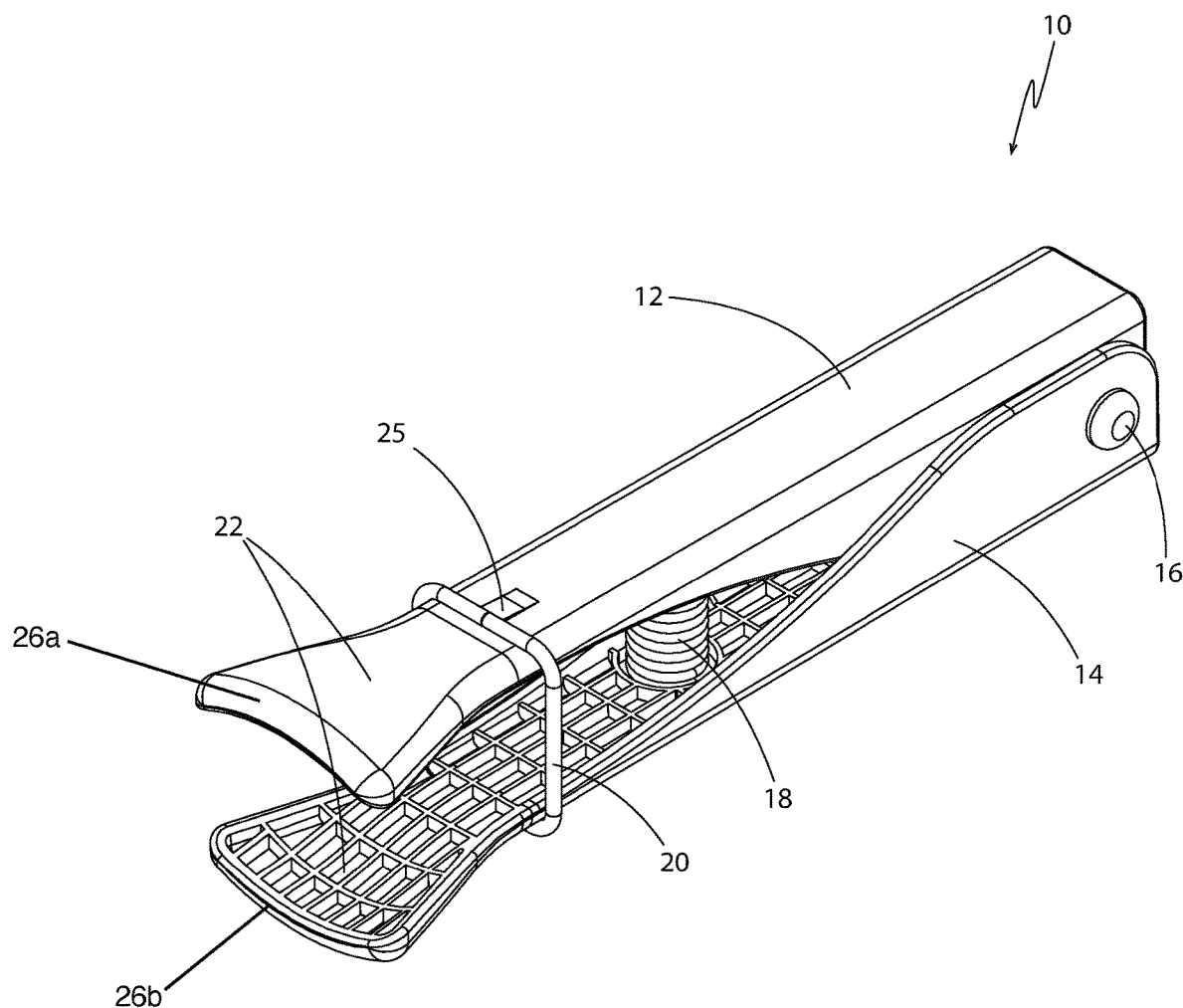
FIG. 1 is a perspective view of a dog boot application device in a closed position.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprise" and any of its derivatives (e.g. comprises, comprising) as used in this specification is to be taken to be inclusive of features to which it refers, and is not meant to exclude the presence of any additional features unless otherwise stated or implied. The term "comprising" as used herein will also be understood to mean that the list following is non-exhaustive and may or may not include any other additional suitable items, for example one or more further feature(s), component(s) and/or element(s) as appropriate.

As used herein, the terms "comprising," "having," "including" and "containing," and grammatical variations thereof, are inclusive or open-ended and do not exclude additional, unrecited elements and/or method steps. The term "consisting essentially of" when used herein in connection with a composition, device, article, system, use, or method, denotes that additional elements and/or method steps may be present, but that these additions do not materially affect the manner in which the recited composition, device, article, system, method, or use functions. The term "consisting of" when used herein in connection with a composition, device, article, system, use, or method, excludes the presence of additional elements and/or method steps. A composition, device, article, system, use, or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to. The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

As used herein, the terms "elastic" and "elastomeric" refer to materials that have the capability of stretching and reform substantially back to their original shape after stretching. Materials that are elastic or elastomeric are generally able to deform under stretching to a different size or shape and then reform back to their original size and shape once the stretching force is removed.

Herein is described a device that helps to put elastic shoes on a pet by enlarging the opening on an elastomeric shoe to facilitate putting the pet paw into the shoe. The presently described device reduces the force required for opening the aperture of an elastomeric dog shoe by using a tension spring and engaged arms to provide the application of force required to open the elastic boot aperture. The two arms of the device are biased in an open configuration with a compression spring that supports a widened dog boot opening. As such, a person can apply the shoe to the device easily when the device is in a compact or closed position, and utilize the force of the spring to open the shoe aperture. Accordingly, the device assists in applying rubber boots on dogs by opening the boot collar wider to assist the dog walker to open the rubber dog boot in preparation for putting it on the dog. The device assists in stretching and securing the opened boot while on the device and then the boot is placed on the dog and the device removed. This eliminates the need for sustained human effort in widening an elastomeric dog boot opening to accommodate a pet paw.

The present dog boot application device is a tong-like structure comprised of two arms that are connected at one end using a pin/rivet system (hinge) and separated at the opposite end with a spring connecting the central regions of each arm. In its resting state, the dog boot application device exists in an open configuration, with the arms fully separated to the extent allowed by the spring. Arm heads with flanges for engaging with an elastic dog boot are present on the ends each arm that is distal to the hinge point. With applied force, the arms can be compressed into a semi-closed configuration and secured together by sliding a collar from the hinge to a region adjacent to the flanges. This allows a dog boot to be easily mounted onto the flanges. With the elastic dog boot in place and the collar slid toward the hinge, the dog boot application device is allowed to relax into its biased open configuration and thereby widen the cavity of the dog boot.

The presently described device minimizes the exertion required to put on elastic pet boots by removing the required force for the boot widening process from the owner using mechanical biasing of the spring toward either the open arm configuration. In other known devices there is no natural inclination for pet boot tongs to return to an open state after being closed. The present device harnesses the mechanical force offered by a compression spring to bias the arms in an open configuration that is associated with a widened dog boot opening, supporting the elastic dog boot to remain in its stretched state. The dog boot application device thus simplifies the process of widening a pet boot opening while reducing the effort required to maintain this open configuration to zero. This contrasts with devices of the prior art, which rely on continued user effort to keep a dog boot in the open configuration. In being biased in an open configuration, the present dog boot application device allows an owner to focus their attention exclusively on their pet without having to concern themselves with whether the boot is sufficiently open to accommodate a paw. For example, the device with an attached dog boot could be positioned and stabilized somewhere to maintain a widened dog boot opening without any additional human intervention. An owner would then have both hands free to guide their dog's paw into the opened boot. This is an especially useful feature for those dogs that are sensitive about their paws and require a slow and gentle approach to applying a dog boot.

FIG. 1 is a perspective view of a dog boot application device 10 in a closed position. The device itself has five main parts: first and second arms 12, 14; a connecting pin or hinge 16; a collar 20; and a compression spring 18. The sleeve 20 can be separate or removable component, or the device can have a stopper to retain the collar 20 on the device when the collar 20 is moved toward the hinge and the first and second arms 12, 14. The pin or hinge 16 connects the first arm 12 and second arm 14 at the base of each arm. The compression spring 18, which is preferably mounted on a post on the inner side of each arm near the middle of the arm, forces the arms open in a biased open configuration. This allows the elastic dog boot to be stretched open when applied to the flanges 26a, 26b on arm heads 22. The collar 20 can moved or slid upward or downward toward and away from the arm heads 22. The arm heads 22 at the end of each of the first arm 12 and second arm 14 have flanges 26a, 26b to engage with the aperture of an elastic dog boot when the aperture is folded over the flanges to enable a wider opening of the stretched rubber dog boot. The arms 12, 14 are secured at the bottom of each arm at the end opposite of the flanges. A pin or hinge 16 attaches the arms together and enables opening and closing rotation, or angle change of the two arms 12, 14 with respect to one another.

In this configuration, the compression spring 18 is visible in a compressed position and the first arm 12 is substantially parallel to a second arm 14. The spring is preferably supported and held in place by a short post part way up the inside of each arm on which the spring can be mounted and held in place. The backs or outside of the arms 12, 14 can be flat or curved to facilitate gripping or holding. The flanges 26a, 26b that have an arced or a "U" shaped cross section so that the opening of the boot is rounded to preserve the structural integrity of the boot and avoid ripping, and to provide a substantially circular, oval, or stadium-shaped opening for inserting a paw. Angular movement of the arms 12, 14 about the hinge 16 allow the operator to control the distance between flanges 26a, 26b. In this way, the arms allow the flanges 26a, 26b to be operated mare easily by engaging the principles of leverage. The arms are long enough for the hand of an adult person to grip the arms which have been attached at the base or hinge and squeeze them to bring the two flanges 26a, 26b together. To push the arms together against the force of the compression spring a user can apply pressure with their hands, or use a surface such as a table, floor, or wall to provide counter pressure.

In the shown embodiment, the arms 12, 14 are made of a rigid plastic material. However, other materials for the arms and pin are contemplated, such as other types of plastic, wood, and metal, provided that the arms are sufficiently rigid to allow the arms to be squeezed together and to support the device while under strain when engaged with an elastic dog shoe. The dog boot application device can be comprised of one or more different materials, provided the end product is of sufficient strength to (a) support the structure of the design, (b) withstand the pressure of the spring mechanism, and (c) withstand the tension created by the boot being stretched over the head. Possible materials to manufacture the device out of may include but are not limited to various types of wood, plastic or metals. In one example the arms 12, 14 can be fabricated from, for example, a durable rigid polymer or thermoplastic material, which may be, for example, form molded, injection molded, or 3D printed. The arms may also be made of durable metal, for example steel or stainless steel. The material thickness is preferably between about of 0.15 to 0.50 cm and thick enough to withstand any bending force that may be applied by the compression spring.

Preferably, the arms will have a length from hinge end to flange in the range of about 17.0 to 25.0 cm and a width of about 1.5 to 3.0 cm. Preferable forms of the device comprise arm heads having flanges 26a, 26b with curved or square edges and a hollow "U" shape to accommodate the circular or near circular opening desired for the stretched aperture of the dog boot, however early prototypes have shown that straight flanges with non-cornered edges can also be used. In the shown embodiment the arm height taper from 2.5 to 4.5 cm at the base and, at a 15 to 20 cm distance from the base of the device, however it is noted that tapering of the arm heads is optional. In an embodiment, the tapered region of the arm heads can be between about 0.30 to 1.25 cm in height relative to the flat longitudinal arms 12, 14. At the point at which the arm heads 22 begin, the "U" shape of the arms ends and a flat, uniform 0.15 to 0.5 cm thickness begins where the flanges begin. At the 14.0 to 20.0 cm point of the arms the width of the arms begins to expand at a 10 to 20 degree angle for a distance of 3.0 to 6.0 cm. At the edge of the flanges, the flanges measure 3.0 to 6.0 cm wide and 0.10 to 0.60 cm thick. In addition, the arms may be expandable or variable in length to open differently sized pet shoes. The arms 12, 14 may also have a flattened outer or side surface to allow the device to rest on a flat surface when not in use. Alternatively, each arm 12, 14 may have a rounded outer surface to accommodate the hand of a user when manually operating the device. The arms may also be slightly mottled to further assist a user in gripping the device.

The hinge 16 can be comprised, for example, of a pin and rivet system, cotter pin, or other hinge type, including but not limited to a ball-bearing hinge, butt hinge, concealed hinge, or hinge plate. Where a pin is used to secure the device at the hinge 16 region, the pin may be comprised of any hard, durable material, such as for example plastic, metal, or wood. The hinge 16 may also be made from the same or different material used to construct the arms. In the depicted embodiment, the hinge pin can be, for example, between about 2.75 to 6.25 cm long, 0.50 to 2.25 cm thick, and round in cross-sectional shape to ease arm rotation. It is understood, however, that the hinge length, width, and features can be selected in combination with the arm and configuration and provide a secure point of rotation for the arms while being compatible with the other structural features of the device. The hinge shown is inserted in holes within each of the arms 12, 14. In one embodiment these holes can be 0.3 to 2.0 cm in diameter, or preferably 0.3 to 1.0 cm in diameter and line-up so that the pin may slide though them and be secured thereto to hold the arms together. In one embodiment the top of one side of the hinge pin is a large, flat disk that is between about 0.5 to 2.0 cm wide and 0.10 to 0.90 cm thick. The disk can also part of the pin construction, however various other securing devices including cotter pins and others may also be used with the hinge. The disk as shown prevents the pin from sliding out of the holes once inserted, and similar devices may serve the same function to secure the arms with respect to the hinge. The end of the pin opposite to the disk has a hole through which a hinge can be inserted. The hinge preferably is 1.5 to 3.5 cm long and 0.10 to 0.30 cm thick (closed) and is inserted through the hole at the end of the pin, once inserted, to keep the pin from sliding back out. It is understood that based on the size of the arm differently sized and shaped hinges may also be used. Locking mechanism 25 secures the collar 20 in place when the spring is compressed.

The spring 18 is preferably made from metal and is preferably between about 5.0 to 7.5 cm long when not compressed. In a metal spring, the wire of the spring 18 can be about 0.05 to 1.5 cm thick, or more preferably 0.1 to 0.35 mm thick, and the centre diameter of the spring 18 is preferably between about 0.50 to 1.5 cm across. In one specific example, the spring 18 can be a ⅝×2.5 inch utility compression spring. The spring 18 is preferably a helical compression spring with loops that remain separated in the unloaded (open) or uncompressed configuration. The ratio of loops to the spring diameter can be variable and any such ratio that produces a spring of sufficient strength to widen a pet boot is contemplated to be within the scope of the present invention. The spring 18 can be made of various types of metal, including hardened steel (low-alloy manganese, medium-carbon steel, high-carbon steel) and non-ferrous metals such as bronze and titanium. In addition, the spring 18 may be arced to better align with the trajectory of the arms 12, 14 as they move from closed to open configurations. Other types of compressions springs can be used that are capable of exerting the same type of force, including but not limited to polymer-based compression springs.

Figure 2:
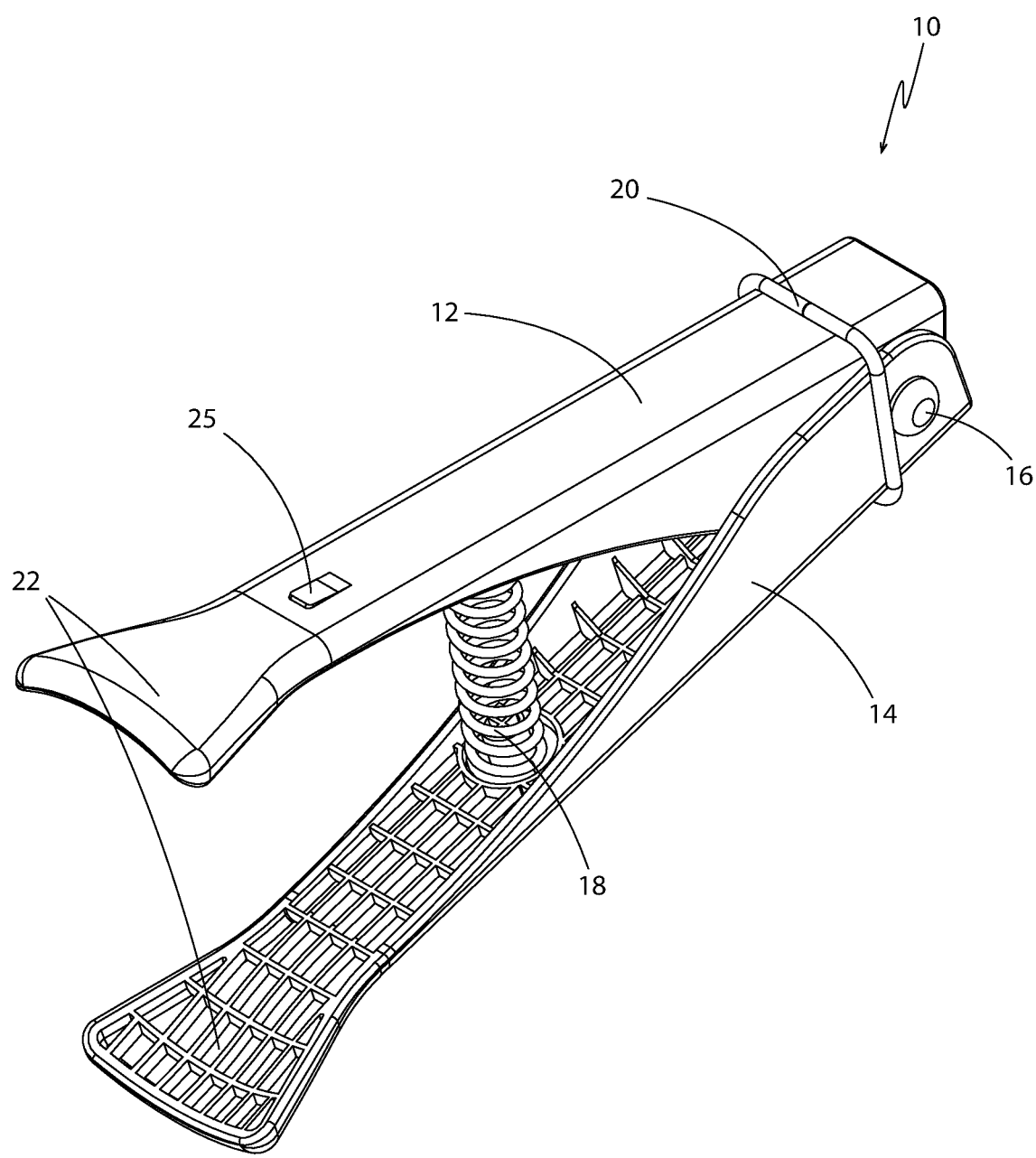
FIG. 2 is a perspective view of a dog boot application device in an open position.

FIG. 2 is a perspective view of the dog boot application device 10 in an open position. In this configuration, the first arm 12 and the second arm 14 have moved away from one another along the axis of rotation produced by the hinge 16, and the spring 18 is visible in a relaxed position. Additionally, a collar 20 capable of retaining the dog boot application device 10 in a closed configuration is shown adjacent the hinge 16 near locking mechanism 25. Other locking mechanisms can be used, such as those at the hinge end that, when engaged, limit angular movement of the arms about the hinge. In the depicted embodiment, the collar 20 takes the form of a sliding band that can move from its original position adjacent the arm heads 22 to a final position adjacent to the hinge 16. This movement renders an open configuration of the dog boot application device 10 by allowing the spring 18 to relax and the first arm 12 and second arm 14 to angularly separate from one another. In one embodiment the sliding band or collar 18 can be a band of between about 3.0 to 7.0 cm in diameter with a 0.05 to 0.20 cm wall thickness and can be made of plastic or any other solid material that has sufficiently low friction so as to accommodate the required sliding motion against the arms. In another embodiment the collar 18 can be a strong steel wire, as shown, with sufficient strength to withstand the force of the compression spring 18.

Where a sliding band is used as a collar 20, guide channels may be present on one or both of the first arm 12 and second arm 14 to guide the motion of the sliding band collar along the arms. These guide channels may comprise protrusions along one or both of the first arm 12 and second arm 14 that engage with compatible recess(es) or channels in the sliding band. Alternatively, protrusions on the sliding band may interact with recesses on one or both of the first arm 12 and second arm 14. Finally, the sliding band version of a collar 20 may be removed from the dog boot application device 10 altogether, or alternatively retained on the device by a retaining mechanism adjacent the hinge. Removing the sliding band collar 20 from the device eliminates any potential interference that unnecessary material might have on the dog boot application device 10 in the open configuration, for example, by preventing the arms 12, 14 from fully separating. Conversely, retaining the sliding band collar 20 on the device makes it less likely to lose the collar as it cannot be separated from the device. The collar 20 may also take the form of a moveable member near the hinge 16 with parallel edges on one side and tapered edges on the other, such that pulling the member away from the hinge 16 aligns its parallel edges with each arm 12, 14 of the dog boot application device 10 and thereby maintains it in a closed configuration.

The sliding band collar 20 can be made of an elastic material that compresses the spring 18 and arms 12, 14 when stretched around a region of the dog boot application device 10 adjacent to the head 22. In this form, the sliding band collar 20 could be stretched and separated from the device when desired. Alternatively, the sliding band collar 20 may consist of a solid, rectangular material (eg. wood, metal or plastic) that is shaped to retain the arms 12, 14 in their closed configuration when positioned adjacent to the head 22. This rigid type of sliding band collar 20 is the one shown in the figure and can be slid on and off the device from the hinge 16. Thus, rigid sliding band locking mechanisms 20 are preferably made of smooth, low-friction materials to accommodate this sliding motion.

In FIG. 2, the head 22 is shown as a widened region of each arm 12, 14 opposite the hinge 16. These heads 22 are wide enough to ensure that a mounted boot will opened to a sufficient degree to allow an elastomeric boot to be placed on the paw of a pet. In a preferred embodiment, the heads 22 are arced to mimic part of the circumference of a dog boot opening when in the closed configuration. This makes it easier to mount a dog boot onto the device by eliminating the need to unduly stretch the boot opening around an incompatible shape. Heads 22 may also take on a multitude of other shapes and sizes to facilitate the application of various types of pet shoes. For example, the heads 22 may be flat or arced to varying degrees to accommodate differently sized pet shoe openings, with the greatest arc required for the smallest openings. It is evident that the device can also be made in different sizes to accommodate different size rubber dog boots and different sizes of dog. Accordingly, the arms may vary in shape and size and can be made at various sizes. In some embodiments, flanges 26a, 26b may be thickened relative to the neighboring region of each arm head 22. This increased thickness can provide necessary reinforcement to the flanges 26a, 26b, which are subject to significant strain when stretching a dog boot opening. Finally, in some embodiments the device can have arm heads 22 that can be optionally detached from their associated arms 12, 14, which can allow various flange and arm head configurations to be used with the same dog boot application device.

Figure 3:
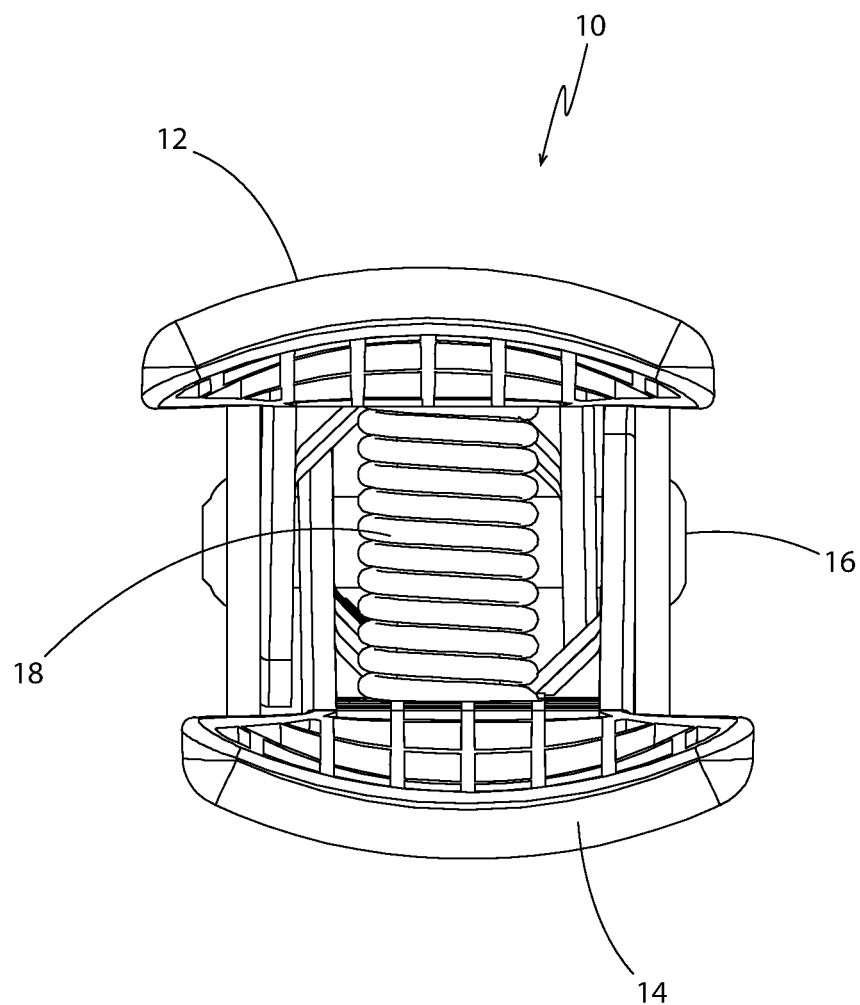
FIG. 3 is a front view of one embodiment of the dog boot application device in a closed position.

FIG. 3 is a front view of one embodiment of the dog boot application device 10 in a closed position. The central compression spring 18 is visible in a compressed position and both the outermost and inner regions of the hinge 16 are also visible. This front view shows the first arm 12 being laterally offset relative to the second arm 14 when the two arms share a production mould such that the two arms can be manufactured from the same mould. This lack of lateral alignment between the first arm 12 and the second arm 14 arises because the two arms stack at the hinge 16 in such a way that the outermost region at this point is conferred by one side of both arms 12, 14. The shape created upon engagement of the arm flanges with the elastic boot will be oval shaped. To mount the lip of a dog boot on arm heads while the arm heads are close together less stretching force needs to be applied to the boot. When the boot is in place, folded over each of the arm heads, subsequent movement of a collar towards the hinge and release of the spring allows the spring to exert a force to separate the arms thereby expanding the dog boot opening. The bias force exerted by the spring opens the boot opening and maintains the wide opening, holding the boot open in place such that the boot can easily be placed on the dog by releasing the elastomeric boot from the arm heads.

Figure 4:
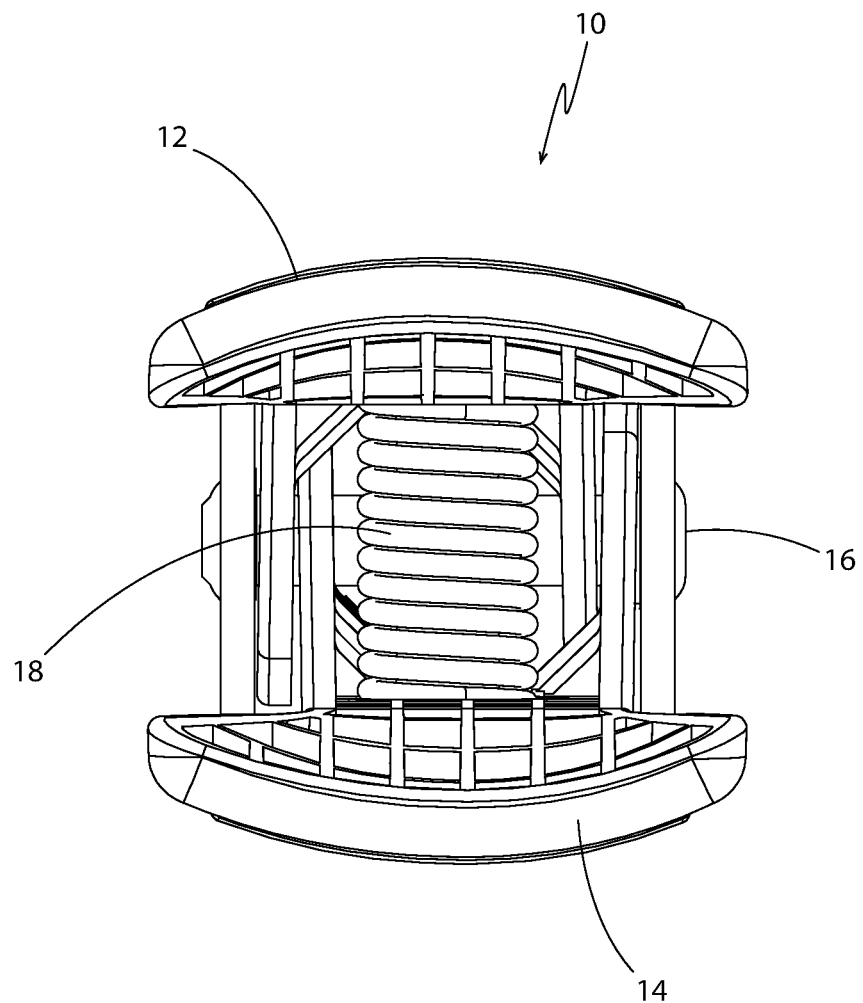
FIG. 4 is a front view of an alternative embodiment of a dog boot application device in a closed position.

FIG. 4 is a front view of an alternative embodiment of the dog boot application device 10 in a closed position, wherein the first arm 12 and second arm 14 have different moulds. In this embodiment, the distal regions of the first arm 12 and second arm 14 are laterally aligned, with the outermost regions of one arm fitting either inside the outermost regions of the other arm at the hinge 16. This allows the outermost regions of the device to be conferred by a first arm 12 at the hinge 16, while a second arm 14 moves within the first arm 12 as the device transitions from open to closed configurations. A side-by-side arm configuration at the hinge end of each arm is also envisaged. Also shown are hinge 16 and compression spring 18.

Figure 5:
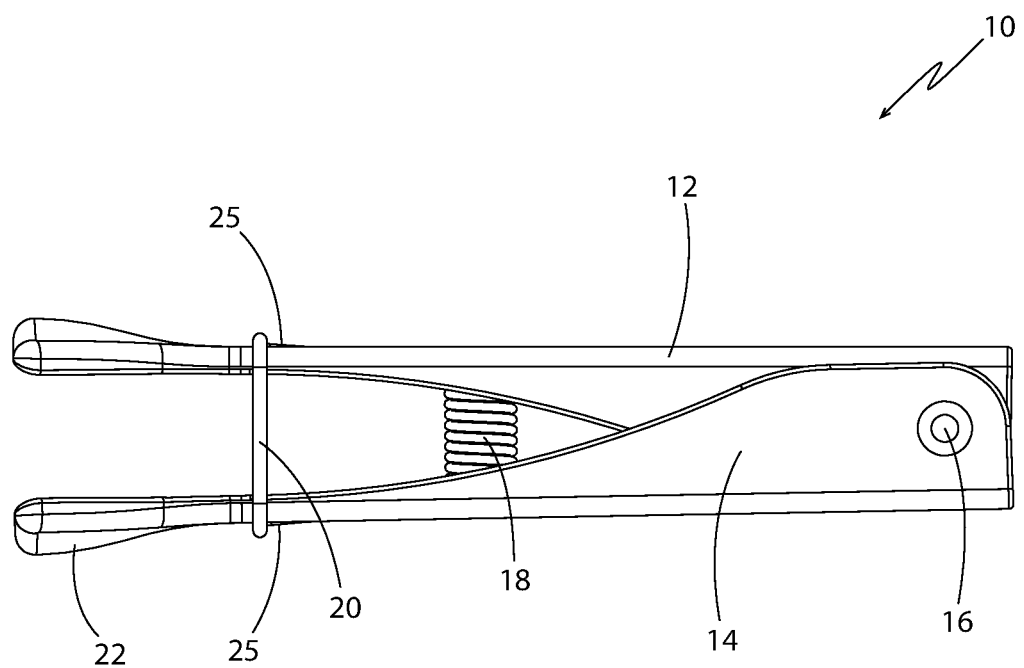
FIG. 5 is a side view of a dog boot application device in a closed position.

FIG. 5 is a side view of the dog boot application device 10 in a closed position. The centrally positioned spring 18, hinge 16, and the thickened or height rise at the arm heads 22 of the first arm 12 and the second arm 14 are visible. Finally, the sliding band or collar 20 is positioned adjacent to the head 22 and held in place with locking mechanisms 25 on both arms, thereby maintaining the first arm 12 and second arm 14 parallel to one another while compressing the spring 18 and attached at the hinge 16.

Figure 6:
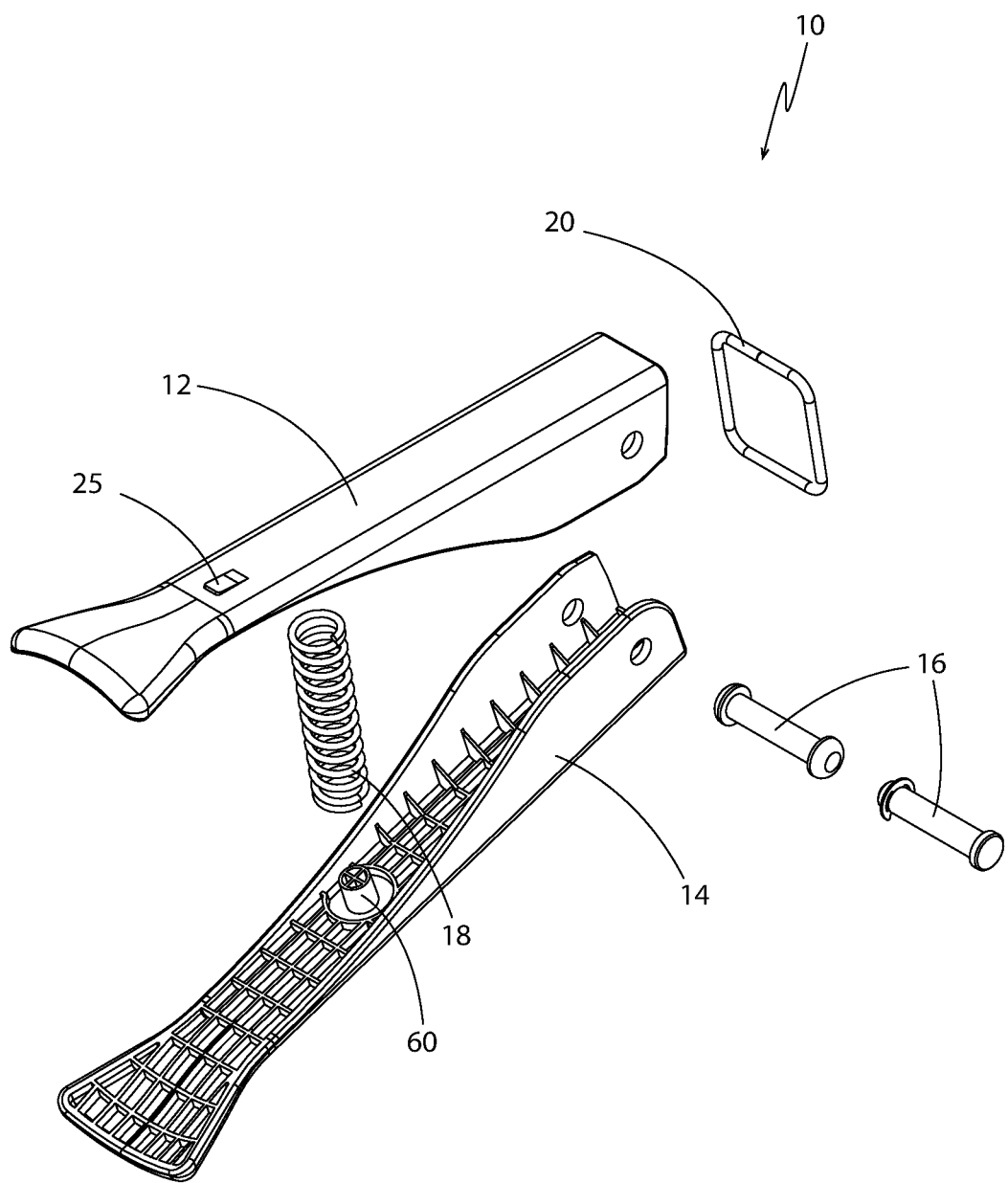
FIG. 6 is an exploded view of a dog boot application device.

FIG. 6 is an exploded view of the dog boot application device 10. In this view, a mounting post 60 is visible on the inside of the second arm 14 with the spring 18 hovering above it. In the assembled device, the spring 18 is secured to a first mounting post on the first arm 12 (not shown), and a second mounting post 60 on the second arm 14. The compression spring 18 is mounted on the arms and their respective raised posts 60, one on each arm and the posts face each other and the spring is mounted with opposite ends inserted over mounting posts 60 on each arm 12, 14. The posts are of a height sufficient to hold and secure the spring 18 in place under pressure. This allows a user to assert equal pressure on the arms from either side without ejecting the spring 18 due to lateral sliding movements that may result from the force being applied. When a user squeezes the arms 12, 14 together, the spring 18 is compressed. Releasing the arms 12, 14 allows the spring 18 to relax, reverting the dog boot application device 10 to its biased open configuration.

In a preferred configuration, the mounting posts 60 are preferably between about 0.30 and 8.0 cm in diameter, and about 0.5 to 2.0 cm tall. The center point of the mounting posts are also between about 5.0 to 20.0 cm from the hinge end, and more preferably between about 10.0 to 12.0 cm from the hinge end of each of the arms. The mounting post 60 can be, for example, a protrusion that is integral to each arm 12, 14 and shaped to accommodate the dimensions of a particular spring 18. The size and cross section of each mounting post is preferably similar to the inner dimensions of the compression spring 18 such that the spring can be mounted securely onto the mounting post on each of the two arms. These mounting posts 60 can be integral to the arm, or alternatively reversibly fastenable to the arms 12, 14. Different shapes of mounting post 60 allows the device to be sized for various spring 18. In a preferred embodiment the spring is made of metal and is 5.0 to 7.5 cm long when not compressed. The wire of the spring can be, for example, from about 0.05 to 1.5 cm thick, and more preferably from 0.15 cm to 0.4 mm thick. The center of the spring is preferably between about 0.50 to 1.5 cm across. The mating arms with intermediate compression spring allows a user to assert pressure on the arms without the spring being ejected due to the force being applied. When the arms are squeezed the spring is compressed and it releases its compression when the arms are released. In the present embodiment, the spring causes the arms to separate and this causes the flanges on the arms to separate and open the mounted rubber dog boot. Hinge 16 is shown to be comprised of a rivet and pin. diameters and sizes such that the device can be adapted to be used with elastomeric dog boots of various sizes, and with different stretching forces required to open the elastic aperture.

Figure 7A:
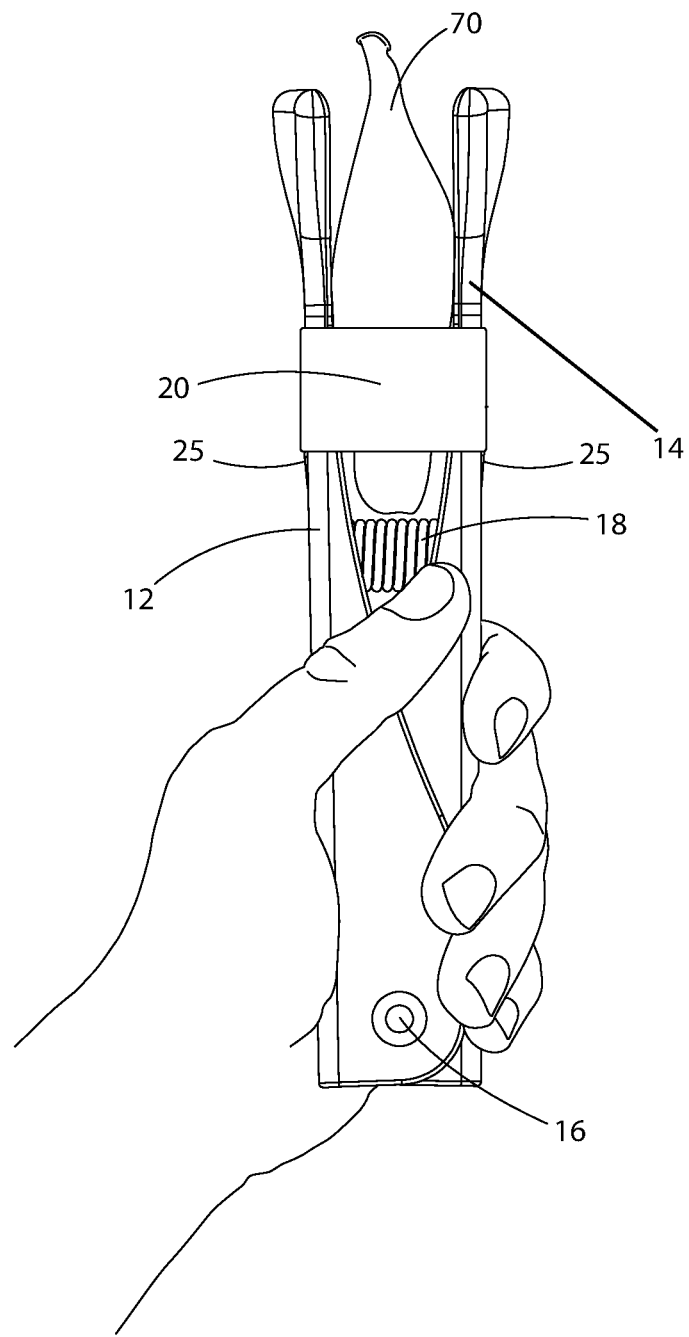
FIG. 7A depicts a first step in a method for dog boot application whereby an elastomeric boot is fitted into the device.
Figure 7B:
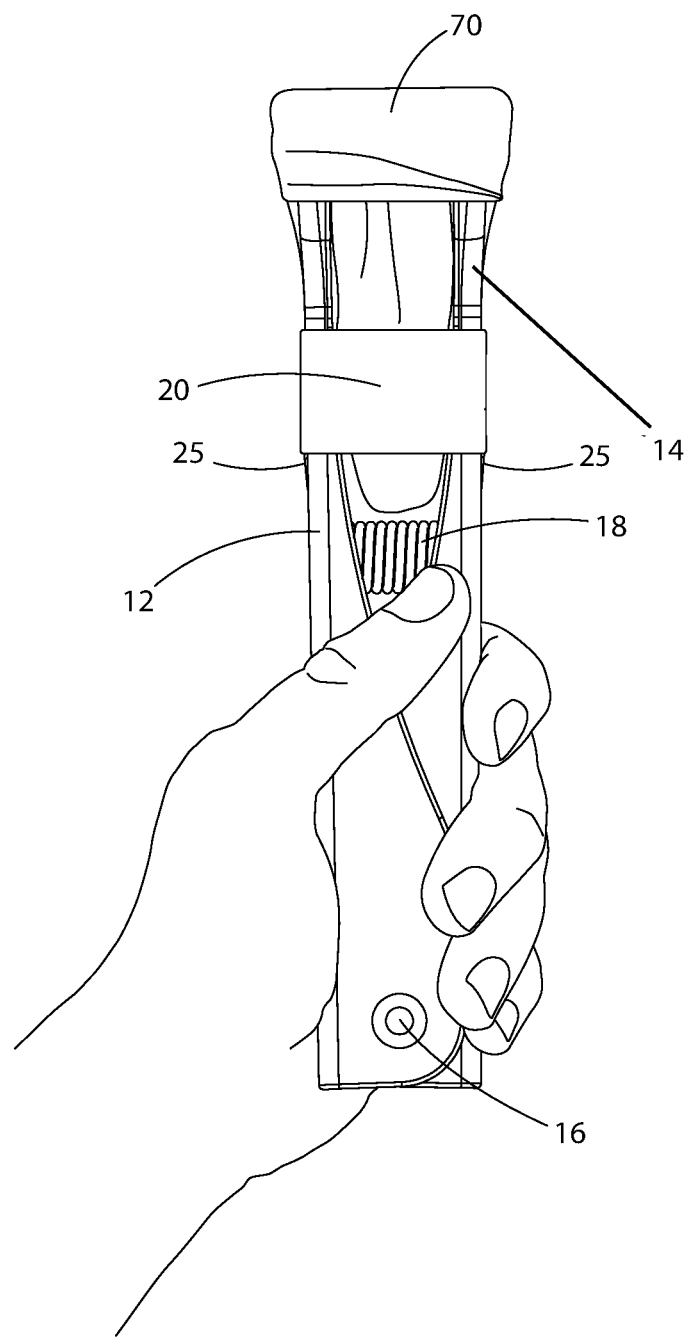
FIG. 7B depicts a second step in a method for dog boot application whereby an elastomeric boot is fitted over the first and second arms of the device.
Figure 7C:
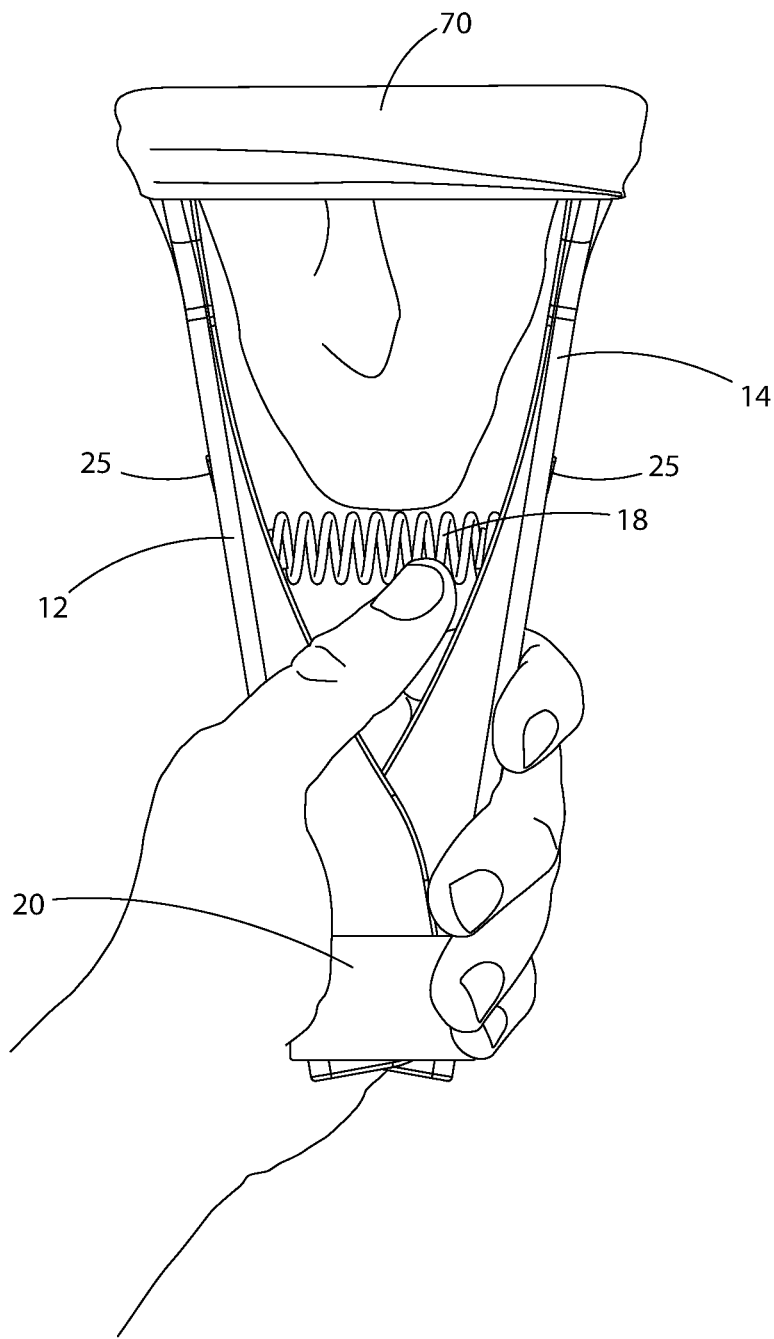
FIG. 7C depicts a third step in a method for dog boot application whereby the arms are released and pressure is applied to the boot aperture by an expansion spring to expand the elastomeric boot opening.

FIGS. 7A, 7B, and 7C depict a method for using the dog boot application device in three steps. The arms and arm flanges of the device cooperate to create a device that can be used to mount a rubber dog boot on the device for ease of application to a dog. When the compression spring 18 is in an unloaded or non-compressed state and no force is applied to the arms to keep them closed the two arms are at a greatest distance from one another. By contrast, the two arms are at a minimal distance from one another when the spring is in its compressed state.

FIG. 7A depicts a first step in a method for dog boot application whereby an elastomeric boot 70 is fitted into the device. First, the closed end of the rubber dog boot is positioned between the flange to the point were enough of the neck of the rubber dog boot extends above the edge of the flange to allow for it to be folded over the edge of the flange. The dog boot application device is shown in a closed orientation with an elastomeric dog boot 70 resting between the first arm 12 and the second arm 14 and locking mechanisms 25 holding the collar 20 in place. The collar 20 is adjacent to the arm heads 22, thereby maintaining the device in a closed configuration without relying on force exerted by a user, and the collar 20 can be positioned adjacent the arm heads once the arms are compressed together. Collar 20 is shown here as a slide collar, which provides additional grip location when sliding relative to the arms 12, 14. In use, the arms 12, 14 are squeezed together relative to hinge 16 and spring 18 is compressed. This joins or brings together the two flanges or arm heads 22 at the top at which time a sleeve is slid up the arms from the base and holds the arms together. The device is designed to be used by the operator with simple application of force to squeeze the two arms together before sliding up the collar 20 to secure the device in a compressed configuration while the dog boot is mounted to the flanges or edges of the arm heads. The device is secured by the sleeve or collar 20 being moved up toward the flanges while the arms are brought together by squeezing the device.

FIG. 7B depicts a second step in a method for dog boot application whereby an elastomeric dog boot 70 is fitted over the first and second arms 12, 14. At this stage the rubber or elastomeric dog boot is then mounted on the device. Mounting the lip of a rubber dog boot around the arm edges or flanges is easily accomplished when the arms of the device and spring are compressed or in a closed configuration and the arms are held closed by the collar 20. The dog boot application device is shown in a closed configuration with the elastomeric dog boot 70 stretched over the arm heads of each arm. In use, the elastic dog boot 70 is inserted between the arm heads and the top or aperture of the rubber dog boot is folded over the flanges or tops of each arm. With the distance between the arm heads at a minimum and the spring 18 compressed, this preparatory step of stretching the elastomeric dog boot 70 is made easy. The arms can be further squeezed together to provide an even smaller opening for fitting the aperture of the elastomeric shoe over. Collar 20 holds the first arm 12 and second arm 14 in a closed configuration, optionally together with locking mechanisms 25, which can be a raised static feature on one or both of the arms 12, 14, or can further have a moving locking feature such as a depressable tab, button, or other dynamic feature which can be depressed to allow movement of the collar 20 along the axis of the arms 12, 14. Hinge 16 guides the movement of the arms 12, 14.

FIG. 7C depicts a third step in a method for dog boot application. Once the rubber dog boot is positioned over the flanges of arm 12, 14, the collar can be removed and the arms released to allow the opening of the rubber dog boot to be stretched wide enough to allow the user to slide the rubber dog boot over the dog's paw and release the rubber dog boot from the edge of the flange. The collar 20 is moved below locking features 25 and the arms are released and the spring allowed to expand. At this stage the sleeve or collar is either removed from the device or slid down toward the hinge 16 and the arms spring open and the rubber dog boot's collar is stretched open assisting the person applying the boot to the dog. Biased compression spring 18 applies outward pressure to the arms, which is applied to the boot aperture to stretch is open in a controlled fashion, and the spring 18 expands the arms and with them the opening for the elastomeric boot 70. Moving the sleeve pushes the arms away from the arm heads and toward the hinge 16 by sliding the collar down to the bottom of the arms at which time the flanges separate and the boot is stretched open.

The material of the device is made of material sufficient to support the structure of the design and to withstand the pressure of the spring 18 mechanism and the tension created by the boot being stretched over the flanges of the arms, also referred to herein as the arm heads. The end of the arms are preferably rounded to allow the arms to open and close without obstruction. The dog boot application device is shown in an open configuration with the spring 18 visible in a relaxed position and the collar 20 removed or near to the hinge. The opening of the attached elastomeric dog boot 70 is expanded and once the outer edges of the elastomeric dog boot 70 have been stretched around the heads 22 of the device in a closed state, the position of the collar 20 can be adjusted to permit opening of the dog boot application device as consequence of the expanding spring 18. This holds the elastic boot aperture open for putting the boot on a paw. Boot 70 is easily removed from the device by squeezing the arms together and/or rolling the folded over opening of the elastic boot 70 off of the device and gently onto the dog paw or leg. In the embodiment shown, the flat surface of the sides of arms allows the device to rest flat on a surface on either or both arms when not in use and also when the dog boot is positioned and opened widely to allow the user to put the device down in the extended position while preparing the dog to put on the boot.

Figure 8A:
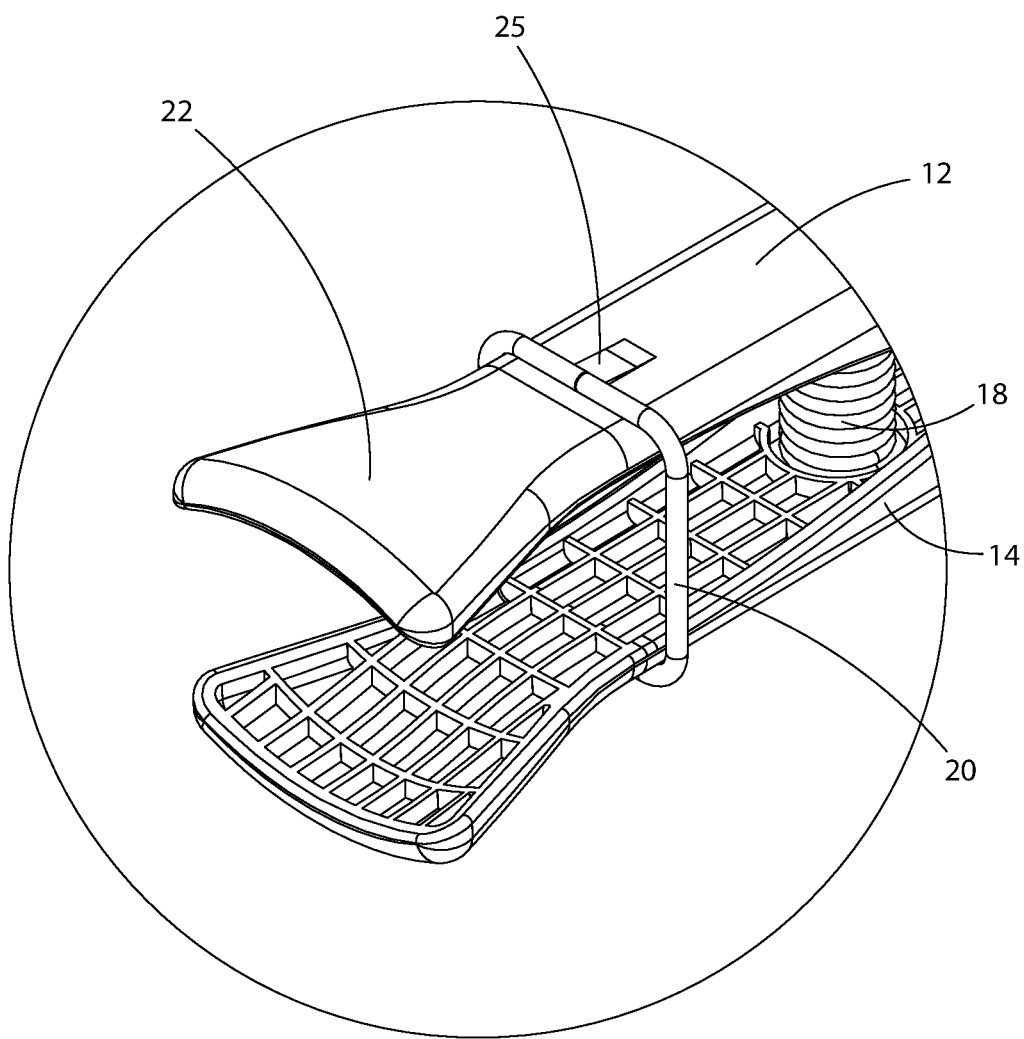
FIG. 8A is a perspective view of the head of the dog boot application device with a smooth grip.

FIG. 8A is a perspective view of the head of the dog boot application device having arms 12, 14, each with a smooth arm head 22 having an arc shape or cross-section. The arc-shaped circumference of the arm heads 22 enables a dog boot to be slid freely over the arms head 22 such that the boot aperture is substantially circular and fits easily on a dog paw. Static locking mechanism 25 retains collar 20 in position to maintain the closed position of the arms 12, 14 with respect to one another while spring 18 is exerting an opening force to force the arms away from one another.

Figure 8B:
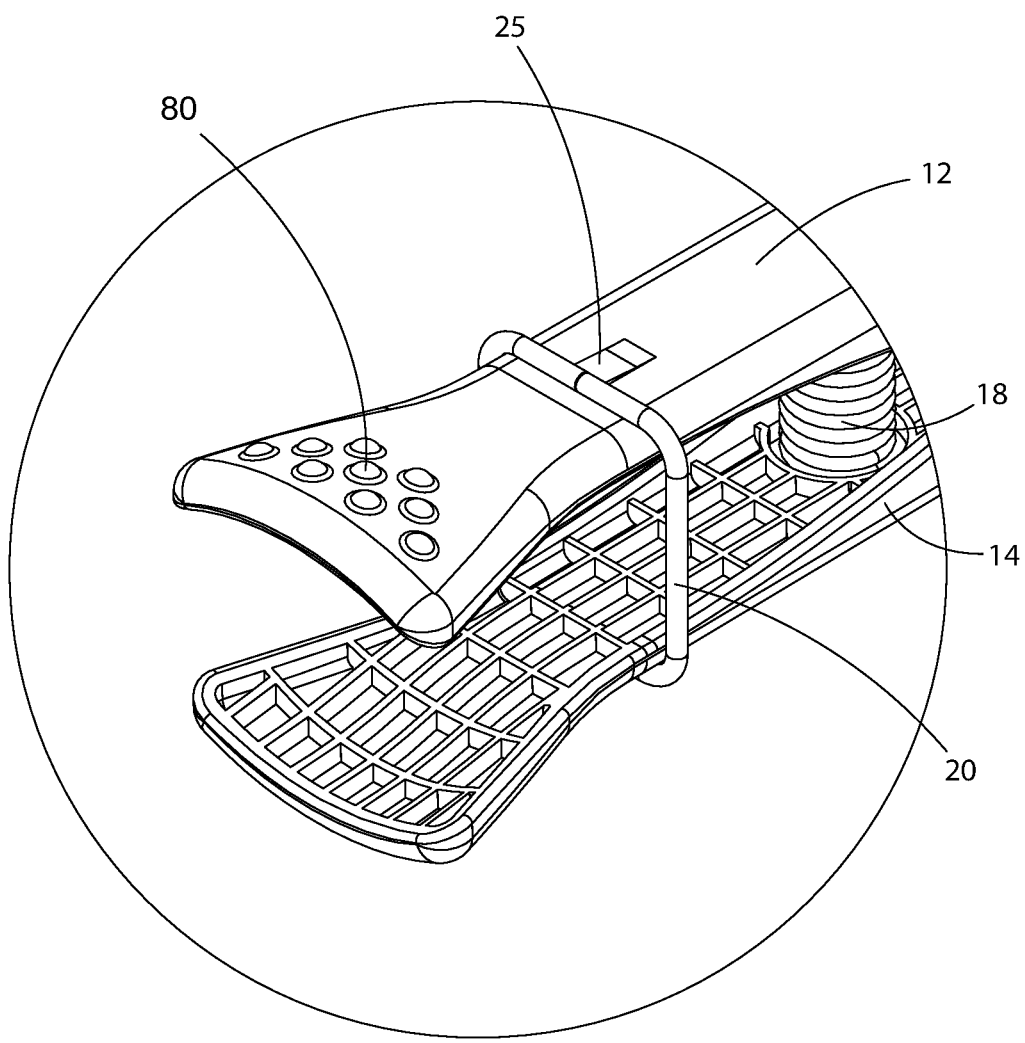
FIG. 8B is a perspective view of the head of the dog boot application device with a textured grip.

FIG. 8B is a perspective view of the head of the dog boot application device with gripping features in the form of button grips 80 comprised of circular protrusions on the flange of each of the arms 12, 14. The surface of the arm heads in this embodiment is slightly mottled or textured to assist with grip by the user or grip of the device to the dog boot, and the mottling or texturing can be in any desired pattern. These bumpy surface features or button grips 80 provides additional friction to help a pet owner grip the device and compress the arms 12, 14 before retaining this closed configuration with the collar 20, and optional locking mechanism 25. Differently patterned protrusions on the outer surface of the head can also promote optimal engagement of the dog boot application device with elastomeric dog boots or gripping of the device by an owner.

Figure 8C:
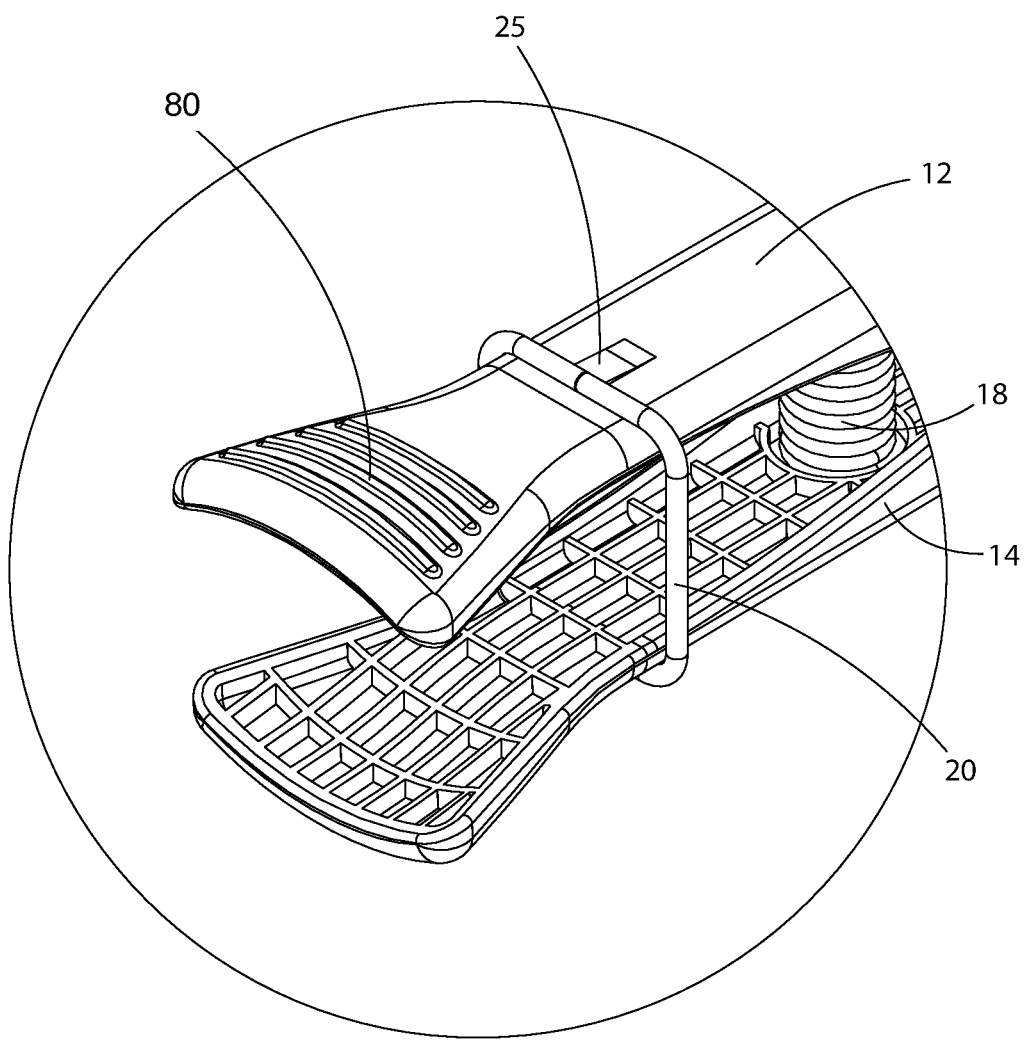
FIG. 8C is a perspective view of the head of the dog boot application device with a striated grip.

FIG. 8C is a perspective view of the head of the dog boot application device with gripping features in the form of striated grips 80 comprised of transverse ridges that run parallel to an edge of the head that is distal to the hinge. These transverse ridges are shown at increasing distances from an edge of the arms 12, 14 and can assist in providing an anchor to the lip of a elastomeric dog boot at particular locations along the end of each arm, further preventing any unwanted sliding of the mounted dog boot along the arms 12, 14 as the device transitions from a closed to open configuration. Collar 20 and locking mechanism 25 are shown holding the device in a secured and closed configuration and keeping biased spring 18 in a compressed state. The ends of arms 12, 14 can also optionally have a patch of high-friction material to allow different grip types to be applied to a dog boot application device. The ends of the arms 12, 14 can also be comprised of various materials to improve engagement and disengagement. For example, high friction materials can help to retain a mounted pet boot on the device and eliminate any unwanted sliding that may otherwise occur during the widening phase, wherein the two arms separate from one another as the spring is relaxed. Suitable high friction materials that can be used include but are not limited to silicone, rubber, and other soft elastomeric materials that have the capacity to grip the elastic boot. The ends of arms 12, 14 may also be made of especially strong materials, such as reinforced carbon or steel, as this region of the device is likely to experience the greatest strain during normal use.

Although the present description is directed to a device for applying elastic or elastomeric dog boots, it is evident that the same can be used for any animal as required, including but not limited to humans, cats, domesticated animals.

All publications, patents and patent applications mentioned in this specification are indicative of the level of skill of those skilled in the art to which this invention pertains and are herein incorporated by reference. The reference to any prior art in this specification is not, and should not be taken as, an acknowledgement or any form of suggestion that such prior art forms part of the common general knowledge.

The invention being thus described, it will be obvious that the same may be varied in many ways. Such variations are not to be regarded as a departure from the scope of the invention, and all such modifications as would be obvious to one skilled in the art are intended to be included within the scope of the following claims.

I claim:

1. A dog boot application device comprising:
   a first arm and a second arm each having a hinge end and a flange end, the flange end having an arm head with a flange having an arcuate cross section, the arcuate cross section of the flange ends on the first arm and second arm each having an inside surface forming an aperture to receive an elastic dog boot, each of the flange ends having an outside surface comprising gripping features spaced from a perimeter edge of each of the flange ends for gripping an outside surface of the elastic dog boot;
   a hinge securing the first arm and second arm together at each hinge end;
   a compression spring secured at an intermediate position between the hinge end and the flange end of each of the first arm and second arm, the spring applying a bias force to push the arm heads of the first arm and second arm away from one another; and
   a collar movable along the length of the first arm and second arm to compress the spring and hold the arms heads together when positioned adjacent the arm heads, and allow the arm heads to move apart when moved closer to the hinge.

2. The device of claim 1, further comprising a locking mechanism adjacent to the arm head on at least one of the first arm and second arm to hold the collar in place when the spring is compressed.

3. The device of claim 1, wherein the arm heads further comprise a high-friction material to retain the elastic dog boot.

4. The device of claim 1, wherein the hinge comprises a pin and rivet.

5. The device of claim 1, wherein the first arm and second arm each comprise a mounting post sized to receive and secure the compression spring.

6. The device of claim 1, wherein the arcuate cross section of the flange ends on the first arm and second arm form a circular, oval, or stadium shaped aperture in the elastic dog boot when the arms are in an extended position and engaged with the elastic dog boot.

7. The device of claim 1, wherein arm head of each arm is tapered relative to the arm.

8. The device of claim 1, wherein the first arm and second arm have a length from the hinge end to the flange end in the range of about 17.0 to 25.0 cm.

9. The device of claim 1, wherein the first arm and second arm have a width of about 1.5 to 3.0 cm.

10. The device of claim 1, wherein the first arm and the second arm comprise one or more of a durable rigid polymer, thermoplastic material, wood, and durable metal.

11. The device of claim 1, wherein the first arm and the second arm are tapered from the flange end to the hinge end.

12. The device of claim 1, wherein the first arm and the second arm have a curved outer surface.

13. The device of claim 1, wherein the compression spring is centrally positioned between the hinge end and the flange end of each of the first arm and the second arm.

14. The device of claim 1, wherein the compression spring comprises at least one of a hardened steel alloy, low-alloy manganese, medium-carbon steel, high-carbon steel, bronze, titanium, and polymer.

* * * * *